Figure 1:
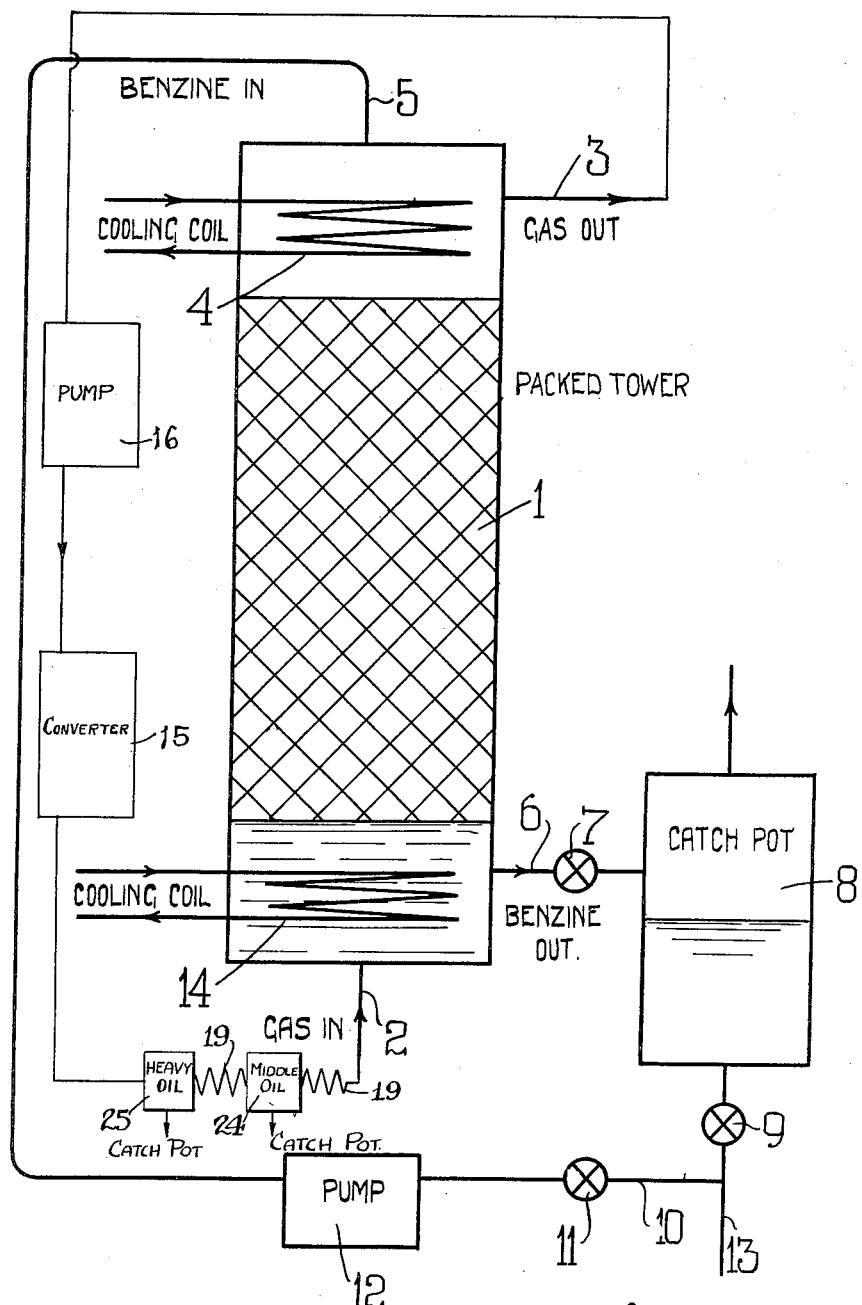

May 22, 1934.     H. G. WATTS     1,959,887
DESTRUCTIVE HYDROGENATION OF COAL, OILS, AND THE LIKE
Filed March 25, 1930     2 Sheets-Sheet 1

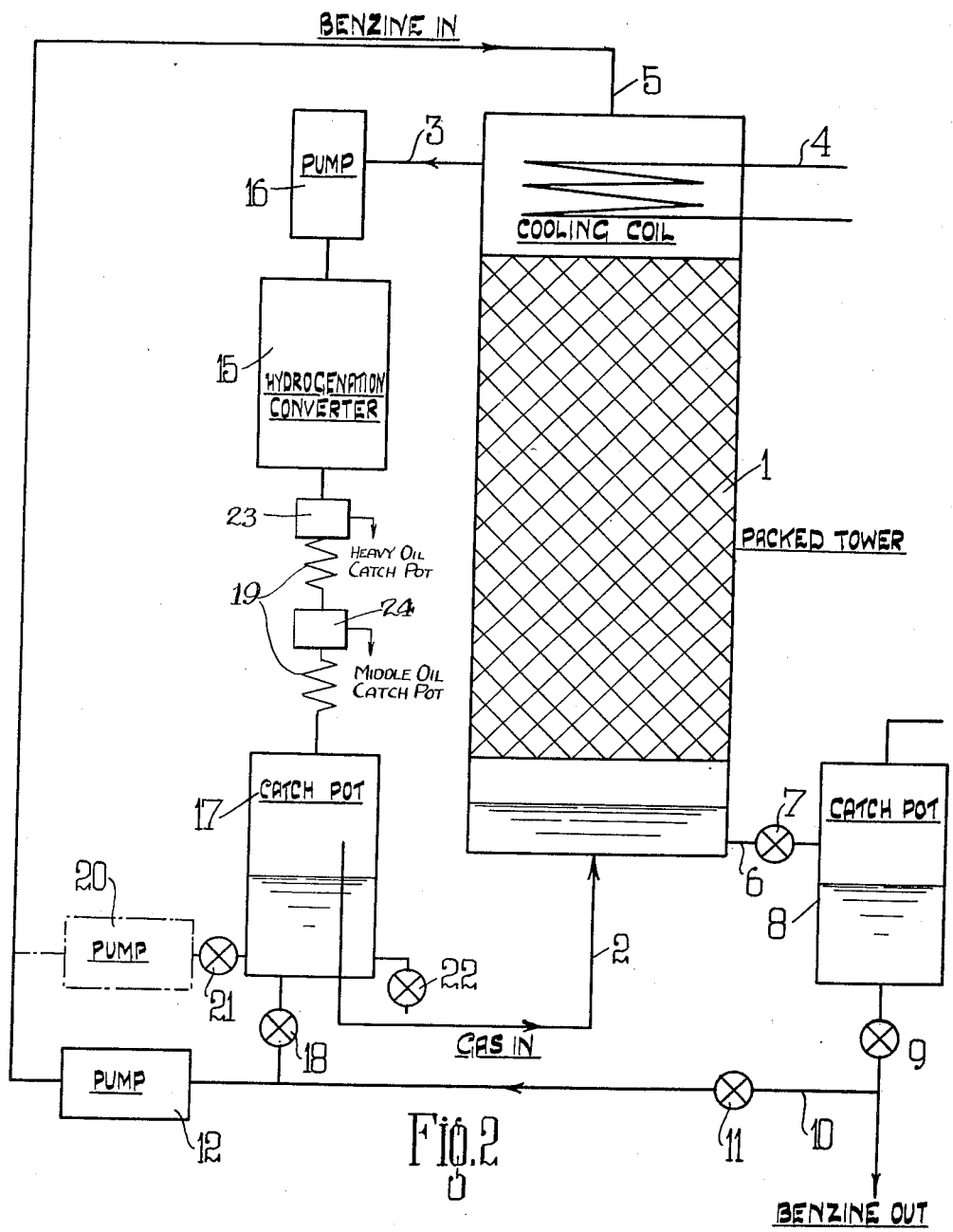

Patented May 22, 1934

1,959,887

UNITED STATES PATENT OFFICE 1,959,887

DESTRUCTIVE HYDROGENATION OF COAL, OILS, AND THE LIKE

Harold Garfit Watts, Norton-on-Tees, England, assignor to Imperial Chemical Industries Limited, London, England, a British company Application March 25, 1930, Serial No. 438,875
In Great Britain April 2, 1929

2 Claims. (Cl. 196—53)

In the destructive hydrogenation of coal, oils and the like a gas is obtained which consists of residual hydrogen contaminated with lower paraffin hydrocarbons. It has already been proposed to recover hydrogen from such gas by removing the lower paraffins by absorption in relatively non-volatile liquids such as gas oil under pressure, and it has also been proposed to scrub the gases with benzine under pressure, and preferably with a benzine obtained in the destructive hydrogenation.

I have found that an efficient removal of the lower paraffin hydrocarbons present in the vaporous reaction products of destructive hydrogenation may be effected by subjecting the said products to cooling in such a manner that the gases are brought into intimate contact with the condensed benzine. The gas is thus scrubbed by the condensate and is purified more or less completely from the said lower paraffin hydrocarbons. According to a further feature of the invention the condensate of benzine used for scrubbing the gas is supplemented by a reflux of liquid benzine which has been treated for the removal of the greater part of dissolved lower paraffin hydrocarbons, the said benzine having previously been used for scrubbing the gas in the manner indicated.

A method of working the invention is illustrated in the accompanying diagram of which Fig. 1 represents one form of the invention and Fig. 2 represents a modification. In Fig. 1 the condenser consists of a packed tower 1 to which gas which has previously been stripped of heavy oil and middle oil by passage through catch pots 23 and 24 maintained at a suitable temperature is supplied by the pipe 2 and removed by the pipe 3. Cooling coils 14 and 4 are provided at the extremities of the tower and also if desired in the middle portion of the tower. The tower is irrigated with a supply of cold benzine from the pipe 5 and the ascending gas is scrubbed by this benzine together with the benzine formed by condensation of vapours present in the gas. The temperature in the tower is preferably maintained at about —10° C. and pressure is preferably about 250 atmospheres, although somewhat lower or higher temperatures and pressures may be used. The benzine is withdrawn at the base of the tower by the pipe 6, and is let down through the valve 7 into the catch-pot 8 where owing to the release of pressure gaseous hydrocarbons are evolved. The liquid benzine is withdrawn through the valve 9 and a part is cirdrawn through the valve 9 and a part is circulated via the pipe 10 which is controlled by the valve 11 to a pump 12 which injects it into the tower through the pipe 5. A quantity of benzine is thus constantly circulated which may be a multiple of that obtained by condensation from the gas during its passage through the tower, and an amount of benzine which is equivalent to that produced by condensation is continually withdrawn through the pipe 13. The gas leaving the tower through the exit 3 consists mainly of hydrogen with only relatively small quantities of methane, etc. and is returned to the hydrogenation process through the pumps 16 and the hydrogenation converter 15.

In the modification shown in Fig. 2 the gaseous and vaporous products from the hydrogenation converter 15 are passed through catch pots 23 and 24 for the heavy and middle oils respectively to the condenser 19 where the benzine is condensed, and the condensed benzine flows into catch pot 17 from which it passes through reducing valve 18 to the benzine circulation while the gas flows as before through the pipe 2 to the tower 1. 22 is a drain valve from the catch pot 17.

Alternatively the liquid may be drawn off through valve 21 and sent through pump 20 to join the degasified benzine from 8.

In the above process high pressures are used, e. g. of 200 atmospheres or over, and during the hydrogenation, temperatures of 400–500° C. may be employed.

I declare that what I claim is:—

1. In the process for the destructive hydrogenation of coal, oil and the like, which comprises treating such material in a hydrogenation zone with hydrogen under high pressure and at an elevated temperature, the method of removing lower paraffin hydrocarbons from the gases evolved in the hydrogenation zone which comprises withdrawing gases and vapors from said zone, condensing heavier liquid hydrocarbons therefrom, passing the remaining gases and the vapors under high pressure into the bottom portion of a scrubbing tower, introducing a cooling medium into the tower for indirect heat exchange to cool the gases and vapors more positively than they can be otherwise cooled whereby benzine is caused to condense and simultaneously to flow counter-current to the gases thereby absorbing the lower paraffin hydrocarbons from said gases.

2. Process according to claim 1 in which the benzine condensed in the tower is supplemented by a portion of the benzine which has previously been used for scrubbing the gas and which has been degasified by release of pressure.

HAROLD GARFIT WATTS.